Figure 1:
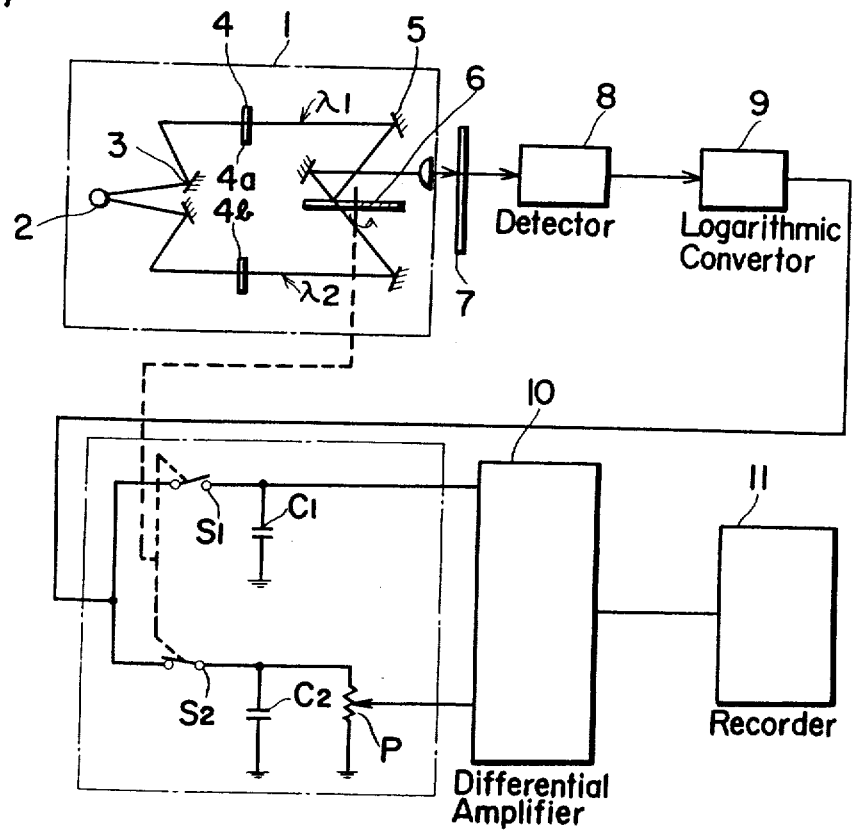

United States Patent
Kurita et al.

[11] 3,887,281
[45] June 3, 1975

[54] SPECTROPHOTOMETRIC MEASUREMENT SYSTEM

[75] Inventors: Takashi Kurita; Hiroshi Yamamoto; Hideki Makabe, all of Kyoto, Japan

[73] Assignee: Shimadzu Seisakusho Ltd., Japan

[22] Filed: Mar. 31, 1971

[21] Appl. No.: 129,667

[30] Foreign Application Priority Data
Mar. 31, 1970 Japan............................ 45-27162

[52] U.S. Cl. .................. 356/96; 250/559; 250/571; 356/97; 356/189; 356/203; 356/205; 356/206
[51] Int. Cl. ...... G01j 3/42; G01j 3/48; G01n 21/22
[58] Field of Search ......... 356/202, 206, 74, 88, 87, 356/96, 201, 188, 93, 210, 97; 250/219 FR, 43.5 R, 559, 571

[56] References Cited
UNITED STATES PATENTS

| | | | |
|---|---|---|---|
| 2,803,161 | 8/1957 | Summerhayes, Jr. | 356/210 |
| 3,089,382 | 5/1963 | Hecht et al. | 356/188 |
| 3,306,156 | 2/1967 | Glasser et al. | 250/43.5 R |
| 3,413,482 | 11/1968 | Ling | 356/88 |
| 3,428,401 | 2/1969 | Buzza | 356/87 |
| 3,518,014 | 6/1970 | Weber | 356/203 |
| 3,522,739 | 8/1970 | Coor et al. | 356/97 |
| 3,547,542 | 12/1970 | Bulpitt et al. | 356/88 |
| 3,586,441 | 6/1971 | Smith et al. | 356/87 |
| 3,588,253 | 6/1971 | Wittmann | 356/93 |
| 3,600,099 | 8/1971 | Schoeffel | 356/206 |
| 3,633,012 | 1/1972 | Wilhelmson | 356/201 |

Primary Examiner—Vincent P. McGraw
Attorney, Agent, or Firm—Craig & Antonelli

[57] ABSTRACT

A spectrophotometric measurement system which comprises an optical illuminator device and photometric device for giving the difference or ratio of reduced intensities of rays of light of different wavelengths which has been transmitted through a sample to be spectroanalyzed. According to the present invention, any sample, liquid or solid, may be subjected to the spectrophotometric measurement. In addition, the base line in an absorption curve can be easily determined without being affected by the background of the sample.

2 Claims, 5 Drawing Figures

(b)

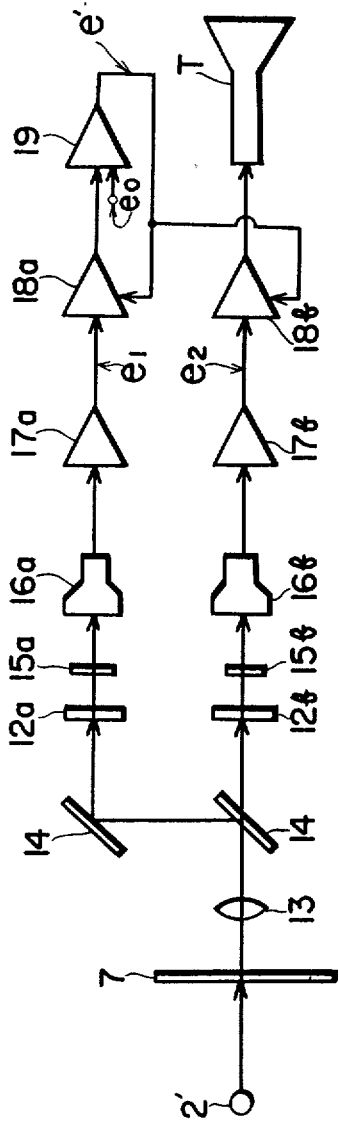
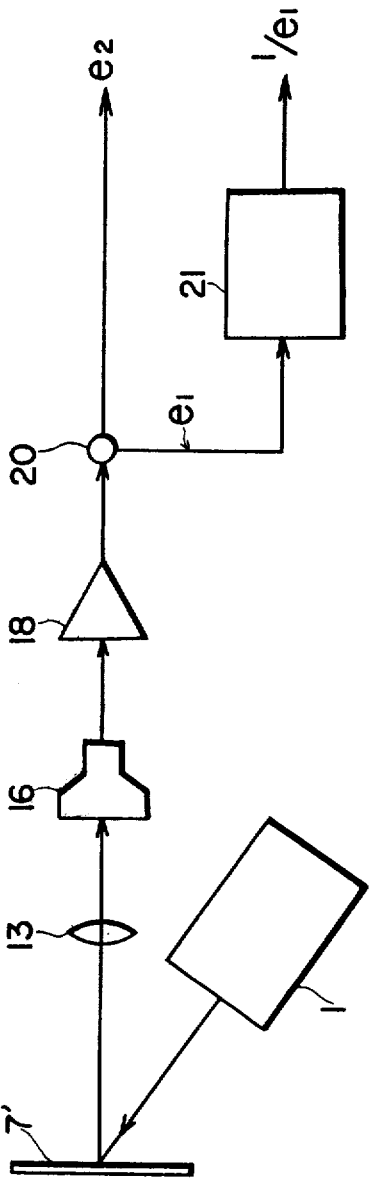
Fig.3
Fig.4

SPECTROPHOTOMETRIC MEASUREMENT SYSTEM

The present invention relates to a spectrophotometric measurement system and, more particularly, to an improved system effective to record the difference or ratio of reduced intensities of rays of light passing through a sample to be spectro-analized.

An instrument such as spectrophotometer has heretofore largely used to effect a quantitative analysis subject to material contained in a sample container with the application of absorption characteristics of the material. In such an instrument, if the sample container has a different thickness over the entire length thereof, the reduced intensity of light detected by a photodetector after it has been passed through the sample container has a tendency to be affected by the difference in the thickness. This is because, if the thickness varies from one position to another over the entire length of the sample, the deflection, reflective and diffraction factors thereof differ from position to position. If the reduced intensity of light passing through such a sample is recorded on recording paper, an absorption curve can be obtained wherein the base line can hardly be determined.

In addition, according to the conventional spectrophotometric instrument, there is such a disadvantage that a sample to be measured which is solid and bulky cannot be placed in the instrument.

Accordingly, one object of the present invention is to provide an improved system for spectrophotometric measurement suitable to detect the distribution and the content of a compound of interest present in a solid base such as paper chromatogram or thin layer chromatogram.

Another object of the present invention is to provide an improved system for spectrophotometric measurement effective to record an absorption curve of the compound of interest on the basis of the difference or ratio of the reduced intensities of light of different wavelengths transmitted through the sample to be spectroanalized.

A further object of the present invention is to provide an improved system for spectrophotometric measurement which may be utilized to effect the spectrophotometric measurement subject to the sample containing a compound of interest developed in two dimensions.

A still further object of the present invention is to provide an improved system for spectrophotometric measurement wherein an optical glass fiber can be utilized to effect the spectrophotometric measurement subject to a sample present on the surface of a solid body such as metal structure or wall portion of a structure without moving such solid body.

A still further object of the present invention is to provide an improved system for spectrophotometric measurement the result of which can be reproduced by means of a visual display device such as monitoring cathode ray tube.

According to the present invention, in order to obtain an optimum performance of the instrument herein proposed, either the light spot projected on the sample to be spectro-analyzed or the sample may be moved to effect the scanning of the composite beam emerging from the optical illuminator device of the instrument.

The present invention will be hereinafter fully described in conjunction with preferred embodiments, taken only for the purpose of illustration thereof, with reference to the accompanying drawings, in which:

FIG. 1 is a schematic block diagram showing a spectrophotometric measurement system according to the present invention, FIG. 2(a) is a schematic diagram showing a paper chromatogram which is one example of sample used for spectrophotometric measurement in accordance with the present invention, FIG. 2(b) is a schematic diagram of a spectral absorbance curves obtained from the paper chromatogram shown in FIG. 2(a), FIG. 3 is a schematic block diagram showing a spectrophotometric measurement system according to the present invention in another embodiment, and FIG. 4 is a schematic block diagram showing a spectrophotometric measurement system according to the present invention in a further embodiment.

Referring now to FIG. 1, the spectrophotometric measurement system according to the present invention generally comprises an optical illuminator device 1 including a suitable light source, 2, a plurality of mirrors 3 for dividing light rays from the light source 2 into two beams of light which are in turn transmitted through respective monochromatic beam generators 4, such as monochromators or filters, effective to produce two beams of different wavelengths, a plurality of mirrors 5 for guiding both beams of different wavelengths so as to intersect at one point and a sector disk 6 rotatable about its own axis of rotation and having a pair of alternate reflective and open sectors for producing a double beam composed of the abovementioned two beams of different wavelengths in an alternate manner at regular intervals which are determined by the rotational speed of the sector disk 6. This optical illuminator device 1 for use in a spectrophotometer assembly so far described is known to those skilled in the art and, therefore, the details thereof are herein omitted.

However, it is to be noted that either of the monochromatic beam generators, for example, the beam generator 4a is adjusted so as to produce a beam of a wavelength of such value that a certain compound of interest present in a sample absorbs at a maximum while the other beam generator 4b is adjusted so as to produce a beam of a wavelength of such value that the compound of interest absorbs at a minimum.

According to the present invention, a quantitative analysis may be effected subject to material not only contained in a sample container, but also absorbed in a solid body. The distribution and content of the compound of interest in a sample, fluid or solid, such as paper chromatogram, thin layer chromatogram, metal surface or any other surface portion of a solid body, blood or chemical solution, can be determined.

For better understanding of the present invention, the description will proceed in conjunction with the spectrophotometric measurement effected to a paper chromatogram such as shown in FIG. 2(a).

In the arrangement shown in FIG. 1, the chromatogram 7 is movably interposed between the illuminator device 1 and a detector 8 including a photoelectric cell (not shown) so that one surface of said chromatogram can be scanned by the composite beam emerging from the optical illuminator device 1.

The detector 8 is adapted to detect the intensity of the composite beam transmitted through the paper chromatogram 7, i.e., the reduced intensity, an electrical output signal thereof representative of the reduced intensity being in turn fed to a logarithmic converter 9.

As is well known in the art, as the composite beam is transmitted through the paper chromatogram 7 that has been moved in either direction at right angles to the direction of the composite beam, the initial intensity of said composite beam is reduced due to the fact that it can be absorbed, scattered and reflected by a compound of interest present in the paper chromatogram. The reduced intensity thus obtained may vary depending upon the location of the compound of interest in the paper chromatogram.

In practice, since light of different wavelengths is successively passed through the paper chromatogram 7, the detector 8 supplies to the logarithmic converter 9, in succession, alternate signals representative of the reduced intensity of light of one wavelength and of the reduced intensity of light of the other wavelength which are in turn converted into the respective logarithmic values by the logarithmic converter 9.

Alternate signals representative of the logarithmic values are then fed to a differential amplifier through respective switches $S_1$ and $S_2$. However, the switches $S_1$ and $S_2$ are alternatively operated in response to the rotation of the sector disk 6. In other words, when the sector disk 6 is in position to reflect the beam of one wavelength $\lambda_1$ on to the paper chromatogram 7, the switch $S_1$ can be closed to permit the signal from the logarithmic convertor 9 to flow therethrough to the differential amplifier 10. On the other hand, when the sector disk is subsequently brought into position to pass the beam of the other wavelength $\lambda_2$ therethrough to the paper chromatogram 7, the switch $S_2$ can be then closed to permit the signal from the convertor 9 to flow therethrough to the differential amplifier 10.

The differential amplifier 10 acts to produce, upon application of both signals representative of the logarithmic values of the reduced intensities of light of respective wavelengths $\lambda_1$ and $\lambda_2$, an output representative of the difference between or ratio of the both logarithmic values of the reduced intensities, which may be respectively expressed as follows;

$$\log I - \log I' \text{ or } \log I/I'$$

wherein I and I' designate the reduced intensities of light of different wavelengths $\lambda_1$ and $\lambda_2$, respectively.

A pair of condensors $C_1$ and $C_2$ disposed as shown in FIg. 1 are provided for storing and smoothing the respective signals so that the differential amplifier 10 can be operated by respective signals representative of the stored values of the condensors $C_1$ and $C_2$.

Although in the circuit arrangement shown in FIG. 1, a potentiometer P is provided as having one end thereof connected with the switch $S_2$, the other end being connected with the ground and a slider connected with the differential amplifier 10, this may be omitted as hereinbefore described.

However, if this potentiometer P is provided, the output signal of the differential amplifier will be:

$$\log I - K \log I'$$

wherein K represents a constant of predetermined value. In other words, the reduced intensity I' can be multiplied by the predetermined value K which can be determined by adjusting the potentiometer P while observing the optimum result obtainable after a few trial measurements have been effected. In any event, if the difference of ($\log I - K \log I'$) can be obtained, no variation in the absorption curve will take place at a position where no compound of interest exists, whereby the base line can be easily determined without affected by the background of the paper chromatogram.

In either case, the output of the differential amplifier 10 is then fed to a recorder 11 effective to automatically describe an absorption curve based on the difference or ratio as hereinabove mentioned.

Referring now to FIG. 2(b), the absorption curve of the paper chromatogram shown in FIg. 2(a) obtained by the instrument shown in FIG. 1 is shown by the chain line $W_3$. In the same drawing, for the comparison, an absorption curve of the paper chromatogram obtained by the use of a single beam of wavelength $\lambda_1$ and that by the use of a single beam of wavelength $\lambda_2$ are respectively shown by the real line and the dotted line.

More specifically, since the paper base of the chromatogram has an uneven thickness over the entire length thereof due to the fact that the aggregation of pulp differs from position to position on the paper chromatogram, the reduced intensity is correspondingly affected by the refraction, reflection and diffraction of light passing through the paper chromatogram.

However, if the wavelength $\lambda_1$ is close to the other wavelength $\lambda_2$, variations in the reduced intensities are substantially the same with respect to each other. Accordingly, if the difference or ratio of these reduced intensities is plotted in a graph in response to the scan of the composite beam, the absorption curve such as indicated by the chain line $W_3$ in FIG. 2(b) can be obtained wherein any influence of the background can be advantageously eliminated.

In the case where the paper chromatogram contains opaque material with respect to the whole range of wavelengths, the difference or ratio of the reduced intensities measured by the system of the present invention will be zero since the reduced intensities of light passing through the opaque material cancel other. Accordingly, it will be clearly understood that no variations in the reduced intensities I and I' appear in the absorption curve.

On the contrary thereto, if only the wavelength $\lambda_1$ is employed, the graph is such as indicated by the real line $W_1$ and, therefore, the base line cannot be exactly determined and the concentration of a compound of interest present in the paper chromatogram, particularly, at portions B in the paper chromatogram shown in FIG. 2(a) cannot be calculated from the peak value of absorption. Furthermore, so far as only the wavelength is involved, this can be absorbed by the opaque material to give a variation in the reduced intensity of light of wavelength $\lambda_1$ which is characteristic to the opaque material. In this case, when recorded in a graph, this variation in the reduced intensity of light passing through the opaque material cannot be apparently discriminated from that of light passing through the compound of interest present in the same paper chromatogram.

Figure 2:
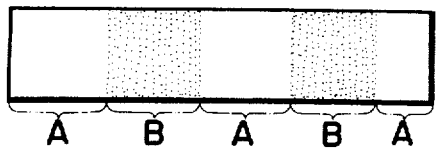
Figure 2:
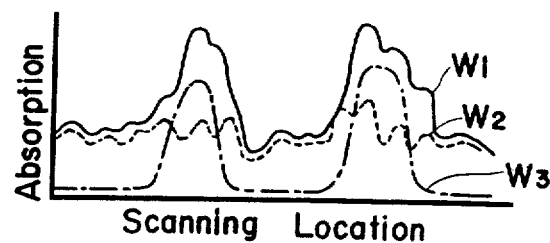

In the preferred embodiment as hereinbefore fully described with reference to FIG. 1 and FIG. 2, although the paper chromatogram is adapted to move in either direction at right angles to the direction of the incident beam, it is to be noted that, while the paper chromatogram is stationarily placed, the beam may be moved to scan the surface of the paper chromatogram. This is particularly advantageous when the spectrophotometric measurement is to be directed to a wall surface of some rigid structure.

In FIG. 3 and FIG. 4, means for visually representing the difference or ratio of the reduced intensities of light passing through the compound of interest present in the paper chromatogram is shown.

Referring now to FIG. 3, instead of the optical illuminator device 1 shown in FIG. 1, a source 2' of monochromatic light and a pair of filters 12a and 12b are employed, one of which being effective to pass the only beam of wavelength $\lambda_1$ and the other being effective to pass the only beam of wavelength $\lambda_2$.

As can be understood, monochromatic light from the light source 2' is adapted to pass through the paper chromatogram 7 on to a condensing lens 13. The light thus passed through the condensing lens 13 travels to a translucent mirror 14 by which a portion of the light is reflected onto the filter 12a while the other portion thereof is passed therethrough onto the filter 12b. Since these filters 12a and 12b have different absorption characteristics and are adapted to pass the only beam of wavelength $\lambda_1$ and that of wavelength $\lambda_2$, respectively, so that the reduced intensities I and I' can be obtained after the light has been filtered therethrough, both beams can be transmitted to respective image receiving units 16a and 16b, such as pickup tubes, through neutral filters 15a and 15b respectively interposed between the filters 12a and 12b and the image receiving units 16a and 16b. However, it is to be noted that the condensing lens 13 is positioned such that an image of a light spot projected on the paper chromatogram by the light source 2' can be focused on each of the image receiving units 16a and 16b. Each of the image receiving units 16a and 16b is effective to convert the optical signal received into a corresponding electrical signal.

Outputs of the image receiving units 16a and 16b which are image transmitting electrical signals each representative of the corresponding reduced intensity of light passing through the paper chromatogram are respectively fed to pre-amplifiers 17a and 17b which are in turn fed to amplifiers 18a and 18b, respectively. However, the amplifier 18a is connected with the other amplifier 18b through an arithmetic amplifier 19 so that a signal generated by the arithmetic amplifier 19 can be applied to the amplifier 18a as a gain control signal.

The arithmetic amplifier 19 has a pair of input terminals, one being connected with the output terminal of the amplifier 18a and the other connected with a suitable reference circuit (not shown) by which a signal representative of a reference level can be applied thereto. This arithmetic amplifier 19 is also adapted to impress its output signal on the amplifier 18a by means of a feedback circuit so that, if any variation exists in the output of the amplifier 18a with respect to the reference level $e_n$, the arithmetic amplifier 19 will generate a control signal $e'$ to the amplifier 18a to modify the value of the signal $e_1$, which has been received by the amplifier 18a, to the value substantially equal to the reference level $e_n$.

On the other hand, the signal $e_2$ transmitted from the pre-amplifier 17b to the amplifier 18b can be amplified by the amplifier 18b. However, since the amplifier 18b is adapted to receive the gain control signal from the arithmetic amplifier 19 as hereinbefore described, the output of said amplifier 18b will be of a value substantially equal to the product of ($e_n \times e_2/e_1$). This output of the amplifier 18b is adapted to form an image of the spot light scanning over the surface of the paper chromatogram on a display device such as a cathode ray tube T operated in synchronism with said image receiving units. If the image of the spot light can be reproduced on the cathode ray tube T as hereinbefore described, the distribution of a compound of interest present in the paper chromatogram can be plotted in response to the scan of the light spot.

In the embodiment shown in FIG. 4, a method of spectrophotometric measurement effected subject to one surface of a rigid body 7' instead of the paper chromatogram is shown. In this instance, the illuminator device 1 is disposed such that the composite beam emerging therefrom can be reflected by one surface of the rigid body 7' which is in turn transmitted to the image receiving unit 16 through the condensing lens 13. An output of the image receiving unit 16 is connected through the amplifier 18 with a discriminator circuit 20 having a pair of switches (not shown, but similar to that shown in FIG. 1) associated with the sector disk included in the illuminator device 1. This discriminator circuit 20 acts to discriminate a signal $e_2$ representative of the reduced intensity of light of wavelength $\lambda_1$ from a signal $e_1$ representative of the reduced intensity of light of wavelength $\lambda_2$. However, the signal $e_1$ is further fed to an arithmetic circuit 21 wherein the signal $e_1$ thus received can be converted into a signal $1/e_1$. If both signals $e_2$ and $1/e_1$ are alternatively applied to the display device such as the cathode ray tube, the light spot scanning the surface of the rigid body 7' can be reproduced. In this case, the switching operation alternatively performed by the pair of switches of the discriminator circuit 20 should be carried out in a rapid sequence so that flickering appearing on the cathode ray tube can be eliminated.

In the embodiment shown in FIG. 4, since the sensitivity of the human eye has a logarithmic characteristic, the intensity of the image perceived by the human eye will be expressed as follows:

$$\log e_1 + \log (1/e_2) = \log (e_1/e_2)$$

and, therefore, it will be clearly understood that the same image reproduced by the display device shown in FIG. 3 can be obtained.

Although the embodiment shown in FIG. 4 is such that the ratio of the signals $e_1$ and $e_2$ are calculated depending upon the logarithmic characteristic of the human eye, an image representing the brightness of the sample alternatively scanned by beams of light of wavelengths $\lambda_1$ and $\lambda_2$ can be directly obtained if a correlation tube is employed. In other words, when an image of the sample formed by the beam of wavelength $\lambda_1$ can be stored in the correlation tube and another image of the sample by the beam of wavelength $\lambda_2$ is subsequently stored in the correlation tube, both images are compared for each picture element so that ratio of brightnesses of the both images of the sample respectively formed by the beams of wavelengths $\lambda_1$ and $\lambda_2$ can be represented in the form of a picture.

In the foregoing embodiments of the present invention, it is to be noted that the wavelengths $\lambda_1$ and $\lambda_2$ of the beams employed should be selected such that either of them can be absorbed at a maximum and the other at a minimum by a compound of interest to which spectrophotometric measurement is effected and that both wavelengths act in the same behaviour with respect to the base containing such compound of interest.

Although the present invention has been fully described by way of example wherein the paper chromatogram is employed, it is to be noted that other than the paper chromatogram can be employed such as hereinbefore described. In addition, if an optical glass fiber such as light guide or image guide is employed for guiding the composite beam toward a surface of a stationary object to which the spectrophotometric measurement is to be effected, the measurement can be facilitated without moving either the illuminator device or the photometric device. In this case, the wavelengths $\lambda_1$ and $\lambda_2$ should be close to each other so that the diffraction factor, reflection factor and absorption coefficient of the glass fiber can be equal with respect to such wavelengths. In addition, so far as the optical fiber is employed in connection with the system of the present invention, variations in transmittivity of the beams passed through the optical fiber can be cancelled so that the difference or ratio of the reduced intensities can be given.

Although the present invention has been fully described by way of example, it is to be noted that various modification and change are apparent to those skilled in the art and, therefore, the present invention is not to be limited by the foregoing preferred embodiments taken only for the purpose of illustration thereof.

What is claim is:

1. A spectrophotometric measurement system comprising:

first means for scanning a first beam of light having first and second wavelength components over a sample of a material, the constituents of which occupy a substantially fixed position within said material, to be spectroanalyzed, said first and second wavelength components impinging upon said sample along the same light path;

second means, disposed relative to said sample upon which said first beam of light has impinged, for receiving said first beam of light after it has impinged upon said sample and for generating first and second electrical signals representative of the intensities of said first and second wavelength components, said second means comprising means for separating said first beam of light, after it has impinged upon said sample, into first and second portions, a first filter disposed in alignment with the direction of said first portion of the separated beam of light and adapted to pass a beam of said first wavelength therethrough, a second filter disposed in alignment with the direction of said second portion of the separated beam of light and adapted to pass a beam of said second wavelength therethrough, a first image receiving unit for receiving an image of the sample to be analyzed, said image being carried by said first separated beam portion, and a second image receiving unit adapted to receive an image of the sample which is carried by said second separated beam portion;

third means, responsive to said first and second electrical signals generated by said second means, for producing a third signal representative of the ratio of said first and second signals, said third means including first and second amplifier means, respectively disposed to amplify the outputs of said first and second image receiving units, an arithmetic amplifier coupled to the output of said first amplifier means and a reference signal input, for comparing the output of said first amplifier means with said reference signal, to thereby control said first amplifier means in response to variations in the output of said first amplifier means, and for supplying the output from said arithmetic amplifier to said second amplifier means as a gain control signal; and fourth means, responsive to the output of said third means, for recording variations in the ratio of the intensities of said first and second wavelengths, said fourth means comprising means for displaying the signal output of said second amplifier.

2. A spectrophotometric measurement system comprising:

first means for scanning a composite beam of light having first and second wavelength components over a paper chromatogram to be spectroanalyzed, said first means including means for producing a first beam of light having said first wavelength over a first beam path and a second beam of light having said second wavelength over a second beam path, and a rotational sector disk, disposed in each of said first and second beam paths, for alternately interrupting each of said first and second beams of light while directing each of said second and first beams of light, respectively, along the same third beam path to thereby produce said composite beam of light formed of sequentially alternate light beam components having said first and second respective wavelengths, said paper chromatogram being adapted to move in either direction at right angles relative to the direction of said composite beam of light;

second means, disposed relative to said paper chromatogram upon which said composite beam of light has impinged, for receiving said composite beam of light after it has impinged upon said paper chromatogram and for generating first and second electrical signals respectively representative of the intensities of said first and second wavelength components;

third means, responsive to said first and second electrical signals generated by said second means, for producing a third signal representative of the ratio of said first and second electrical signals, said third means including means for producing a logarithmic representation of said first and second electrical signals and a differential amplifier for generating said third signal representative of the logarithm of the ratio of said first and second signals; and fourth means, responsive to the output of said third means, for recording variations in the ratio of the intensities of said first and second wavelengths.

* * * * *